(12) United States Patent
Longo et al.

(10) Patent No.: US 9,210,542 B2
(45) Date of Patent: Dec. 8, 2015

(54) METHOD AND COMPUTER SYSTEM FOR DETECTING CROWDS IN A LOCATION TRACKING SYSTEM

(71) Applicant: NEC Europe Ltd., Heidelberg (DE)

(72) Inventors: Salvatore Longo, Heidelberg (DE); Tobias Jacobs, Mannheim (DE)

(73) Assignee: NEC EUROPE LTD., Heidelberg (DE)

( * ) Notice: Subject to any disclaimer, the term of this patent is extended or adjusted under 35 U.S.C. 154(b) by 95 days.

(21) Appl. No.: 14/100,098

(22) Filed: Dec. 9, 2013

(65) Prior Publication Data

US 2015/0160035 A1  Jun. 11, 2015

(51) Int. Cl.
*H04W 4/02* (2009.01)
*G06Q 10/06* (2012.01)
*H04W 64/00* (2009.01)

(52) U.S. Cl.
CPC ...................................... *H04W 4/02* (2013.01)

(58) Field of Classification Search
USPC ........... 701/400, 409, 422–423, 533; 705/1.1, 705/7.11, 14.4; 342/450
See application file for complete search history.

(56) References Cited

U.S. PATENT DOCUMENTS

| | | | | |
|---|---|---|---|---|
| 5,513,854 | A * | 5/1996 | Daver | 700/91 |
| 6,677,858 | B1 * | 1/2004 | Faris et al. | 340/573.1 |
| 6,707,487 | B1 * | 3/2004 | Aman et al. | 348/169 |
| 6,784,826 | B2 * | 8/2004 | Kane et al. | 342/28 |
| 7,408,502 | B2 * | 8/2008 | Percy et al. | 342/357.52 |
| 8,462,048 | B2 * | 6/2013 | Percy et al. | 342/450 |
| 2002/0165731 | A1 * | 11/2002 | Dempsey | 705/1 |
| 2007/0005419 | A1 * | 1/2007 | Horvitz et al. | 705/14 |
| 2008/0045234 | A1 * | 2/2008 | Reed | 455/456.1 |
| 2011/0276440 | A1 * | 11/2011 | Collins et al. | 705/28 |
| 2013/0157684 | A1 | 6/2013 | Moser | |

* cited by examiner

*Primary Examiner* — Yonel Beaulieu
(74) *Attorney, Agent, or Firm* — Leydig, Voit & Mayer, Ltd.

(57) ABSTRACT

A method and computer system for detecting crowds in a location tracking system utilizes a grid and the pigeonhole principle to minimize an amount of hardware, memory and/or processing capability required in the location tracking system. In particular, an amount of storage required to determine whether a location update has resulted in a crowd grows only linearly, rather than quadratically, with the number of objects being tracked because a number of active grid points will be, at most, four times the number of objects being tracked. By determining whether an individual active grid point is within a crowd area, the computational time required for detecting a crowd within this crowd area is independent from the total number of objects being tracked.

18 Claims, 3 Drawing Sheets

METHOD AND COMPUTER SYSTEM FOR DETECTING CROWDS IN A LOCATION TRACKING SYSTEM

FIELD

The present invention relates to a method for detecting crowds in a location tracking system, as well as to a computer system for performing the method.

BACKGROUND

There are a variety of reasons for detecting crowds of objects such as vehicles, goods, people, animals, etc. For example, this information can be useful for determining traffic information and managing traffic flow (such as determining alternative routes), managing events (such as concerts or emergencies), allocating resources (such as network resources or security or police force) or providing notifications or services relating to the crowds (such as notifications about being in or approaching a crowded location and directions out of or away from the crowded area). This information is also useful to a wide range of service providers, such as telecommunications companies, transportation companies, event planners or government authorities, as well as to drivers or individuals.

Location tracking systems therefore generally refer to systems for determining and tracking the geographic location (e.g., two-dimensional coordinates, such as a longitude and latitude) of objects, for example, in the Global Positioning System (GPS) or the World Geodetic System (WGS). These two-dimensional geographic coordinates can be provided, for example, by GPS-enabled devices, distance sensors, bar code or radio-frequency identification (RFID) scanners.

A crowd refers to the situation in which a square of side length d (d×d) contains a threshold of k or more objects, wherein d and k are selected based on the application. For example, if the reason for detecting the crowds is related to traffic, d could be selected to be relatively large compared to an application for detecting crowds of people. Similarly, if the area is a crowded event center the threshold k could be selected to be larger than, for example, a rural roadway.

Given a total number of objects n, a static determination can be made if there is a crowd by defining the square of side length d around each one of the tracked objects n and then solving the problem of determining whether there exists a union of k or more of the squares. Generally, the problem of determining a length of the union of n intervals is referred to as Klee's measure problem.

In 1977, Jon Bentley proposed an algorithm which is still used today as a solution to Klee's measure problem for two-dimensional rectangular ranges. This solution, known as Bentley's algorithm or a sweep-line approach, because the solution is determined by sweeping a line across the area of union rather than reconstructing the union itself, relies on the use of a segment tree to store individual 1-dimensional distances of the lines. Segment trees are well-known in the art of computer science, and more particularly in the art of computational geometry, as a way for efficiently storing and retrieving a data set of n intervals (i.e., the number of total objects) and require an amount of storage corresponding to n log n and a computational runtime of O(n log n)—the runtime for each insertion or deletion in a segment tree is log n, and therefore n insertions/deletions take n log n runtime.

When the static solution described above is used in location tracking systems, however, in which crowds are detected and tracked with respect to time, and typically in real time, the storage and runtime required increases quadratically (i.e., by a power of 2) with the total number of objects n being tracked. This is because each of the objects n sends updates with a frequency f updates per minute. Therefore, using the sweep-line approach, crowd detection in a location tracking system requires the static solution n log n to be performed n times with frequency $f(f \times n \times n \log n = f n^2 \log n)$, thereby increasing the required amount of storage and computational runtime quadratically with the total number of objects n being tracked.

Accordingly, when there are a large total number of objects n being tracked (as is becoming more and more so the case in location tracking systems), the sweep-line approach is not suitable in that its use would be expensive and burdensome with respect to hardware requirements, as well as slow and cumbersome. For example, in order to be used in a location tracking system that is configured to track a total number of objects n on the order of up to tens of millions of objects, each providing a location update on average about once per second, the sweep-line approach would require an amount of hardware sufficient to process about $10^{12}$ operations per second, and therefore would require a very complex and expensive computer system.

SUMMARY

In an embodiment, the present invention provides a method for detecting crowds in a location tracking system. Using at least one computer system, a grid is defined in two dimensions in a geographic coordinate system. The grid has a predetermined spacing in each dimension between grid points of the grid. A geographic location is received from each of a plurality of objects. The geographic location includes coordinates in each of the two dimensions in the geographic coordinate system. The geographic locations are compared to the grid points. Each of a plurality of the grid points that are positioned within the predetermined spacing to at least one of the objects in each of the two dimensions are defined as active grid points. Each of the active grid points are stored using at least one memory device of the at least one computer system. An updated geographic location is received from a first one of the objects. At least one processing unit of the at least one computer system checks, using the updated geographic location and the geographic locations of other ones of the objects, for an existence of a crowd by determining whether there are four or more times a predetermined threshold number of the objects that are located within the predetermined spacing in each of the two dimensions to a first one of the active grid points that is within the predetermined spacing in each of the two dimensions to the updated geographic location.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
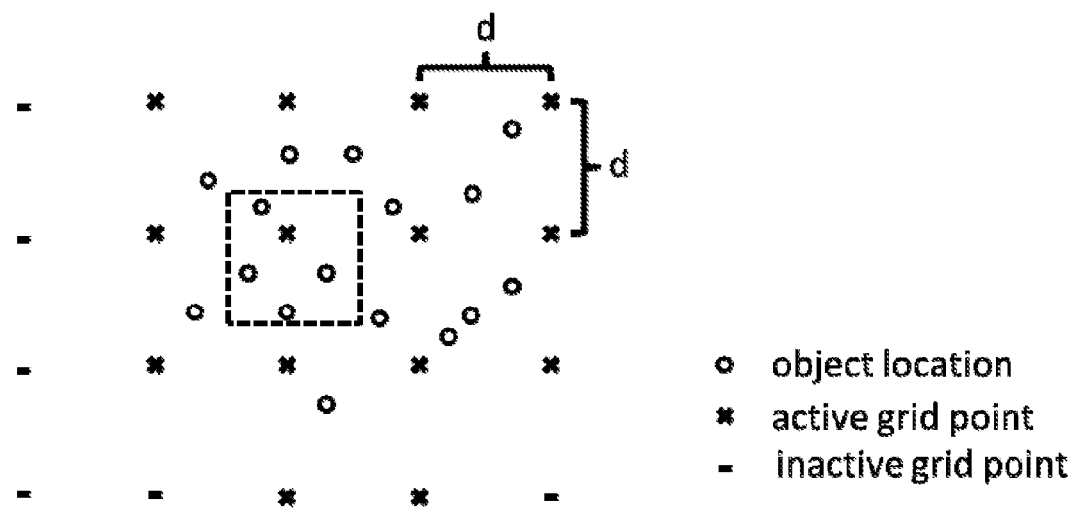
FIG. 1 schematically shows objects being tracked with respect to active and inactive grid points at a time of a location update.

The present invention provides a method and computer system for crowd detection in a location tracking system in which the amount of required hardware grows only linearly with the number of total objects n being tracked. Additionally, the required computational runtime using the method and computer system of the invention can be constant and independent from the number of total objects n being tracked. Thus, a standard computer which can perform billions of operations per second could be suitable for performing the method and/or the method could be easily implemented on one or a small number of servers, even when the number of objects is on the order of tens of millions.

In an embodiment, the present invention provides a method for detecting crowds in a location tracking system. Using at least one computer system, a grid is defined in two dimensions in a geographic coordinate system. The grid has a predetermined spacing in each dimension between grid points of the grid. A geographic location is received from each of a plurality of objects. The geographic location includes coordinates in each of the two dimensions in the geographic coordinate system. The geographic locations are compared to the grid points. Each of a plurality of the grid points that are positioned within the predetermined spacing to at least one of the objects in each of the two dimensions are defined as active grid points. Each of the active grid points are stored using at least one memory device of the at least one computer system. An updated geographic location is received from a first one of the objects. At least one processing unit of the at least one computer system checks, using the updated geographic location and the geographic locations of other ones of the objects, for an existence of a crowd by determining whether there are four or more times a predetermined threshold number of the objects that are located within the predetermined spacing in each of the two dimensions to a first one of the active grid points that is within the predetermined spacing in each of the two dimensions to the updated geographic location.

In another embodiment, the present invention provides a computer-readable, tangible, non-transitory medium having instructions therein which cause one or more processing units of at least one computer system to collectively perform the following steps: comparing geographic locations received from each of a plurality of objects to grid points of a grid defined in two dimensions in a geographic coordinate system, the grid having a predetermined spacing in each dimension between the grid points and the geographic locations including coordinates in each of the two dimensions in the geographic coordinate system, each of a plurality of the grid points that are positioned within the predetermined spacing to at least one of the objects in each of the two dimensions being defined as active grid points; and checking, using an updated geographic location received from one of the objects and the geographic locations of other ones of the objects, for an existence of a crowd by determining whether there are four or more times a predetermined threshold number of the objects that are located within the predetermined spacing in each of the two dimensions to a first one of the active grid points that is within the predetermined spacing in each of the two dimensions to the updated geographic location.

In a further embodiment, the present invention provides a computer system for detecting crowds in a location tracking system. At least one memory device includes coordinates of geographic locations of a plurality of objects and grid points of a grid in two dimensions in a geographic coordinate system. The grid has a predetermined spacing in each dimension between the grid points. At least one processing unit is configured to detect, based on an updated geographic location received from one of the plurality of objects, an existence of a crowd in a computational runtime that is independent from a total number of the objects.

Referring to FIG. 1, a set of grid points are defined geographically in two-dimensions, for example, using GPS. For example, this grid could be locally defined, such as around highways or event centers, or could consist of a global or an infinite set of grid points. In the embodiment shown, each grid point is positioned a distance d from grid points located to the north, south, east, or west (or corresponding directions depending on how the coordinate system is defined). The grid can be generated digitally using at least one computer system 3a of a crowd detection engine 3 (see FIG. 3) with the grid points being displayed in their spatial arrangement and/or stored as a set of coordinates.

The objects are positioned within the grid using their two-dimensional geographic location, for example, as received from a GPS-enabled device, in the same coordinate system as the grid. Considering an embodiment in which two objects are defined to be close to each other if each of their dimensions differ by less than d, a grid point is defined to be active if its distance to an object differs by less than d in both dimensions. This can be determined simply by comparing the coordinates of the grid point and the object in both dimensions. Because an object can then only be close to, at most, four grid points, a total number of grid points which can be determined to be active is limited to, at most, four times the total number of objects n, or 4n. Therefore, an amount of hardware (such as servers or memory devices) required to store the set of all active grid points and each of the objects close to the active grid points advantageously grows only linearly with respect to the total number of objects n being tracked.

Each time the location of an object is updated, it is checked as to whether a crowd has formed or, in other words, whether the location update has caused there to exist a d×d square with k or more objects inside. Because the grid points are defined at the same distance d from each other, any possible d×d square which contains the object whose location was updated must also contain one of the active grid points close to it. Therefore, in order to determine if a crowd has formed, it is sufficient to check whether one of the active grid points close to the object whose location was updated is inside a crowd area.

Figure 2:
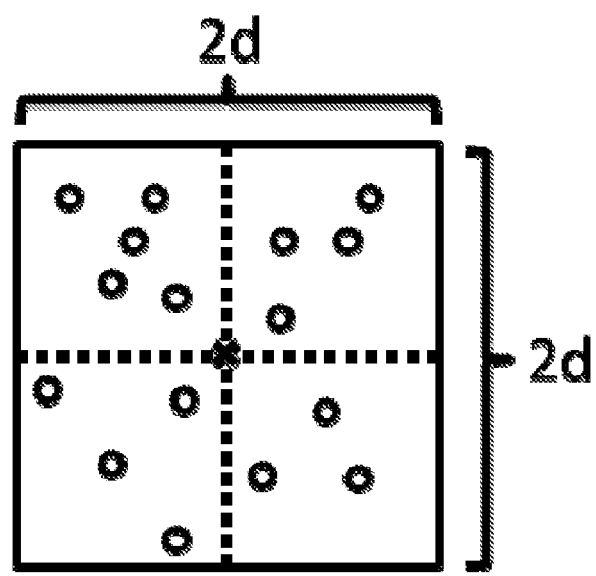
FIG. 2 schematically shows how the pigeonhole principle is used to determine whether or not a crowd has formed near an active grid point.

Referring to FIG. 2, an active grid point close to the object whose location was updated is shown with respect to this object and the other objects at the center of a 2d×2d square (four d×d squares). The active grid point is therefore surrounded in this case by four quadrants of the grid. According to the pigeonhole principle (which states that if there are n pigeons for m holes, where n>m, at least one hole must contain more than one pigeon), if there are ≥4 k objects inside the 2d×2d square, then at least one of the d×d squares surrounding the active grid point must contain k or more objects and it is determined that the active grid point is within a crowd area. On the other hand, if there are less than 4 k objects, then the sweep-line approach described above is used to determine if, within 2d×2d square, there exists any d×d square containing k or more objects. However, because the sweep-line approach is only used here in the case that there are less than 4 k objects, the amount of required hardware and required computational runtime corresponds to 4 k log 4 k, as opposed to n log n, and is therefore independent from the total number of objects n. This is particularly advantageous since k is necessarily significantly less than n, and, in most embodiments, k<<n. Moreover, it is advantageously provided that for a given value of k chosen depending on the application, the computational runtime required for detecting whether a location update has resulted in the formation of a crowd is constant and independent of the total number of objects n. Therefore, an amount of hardware for the processing, or a processing unit capability, can be limited and an amount of memory for creating and storing the segment trees is also limited and independent of the total number of objects n.

Therefore, for each location update, at most four grid points will be active and at least one to all of these four active grid points are checked to determine if they are in a crowd area. As discussed above, this determination will be independent of the total number of objects n. An example of pseudo-code for processing a location update is the following:

```
Input: A new object location o;
Output: Boolean indicating whether a crowd is detected or not;
FOR EACH grid point g close to o:
    add grid point g to set of all active grid points if not already active;
    add new object location o to set of all objects close to grid point g;
    IF grid point g has at least 4k objects close to it THEN
        RETURN true;
    ELSE
        run Bentley's algorithm for checking whether there is a crowd within
        one of the quadrants surrounding grid point g;
        IF algorithm returns true;
            RETURN true;
    ENDIF
ENDFOR
RETURN false.
```

For each location update, the for-loop of the pseudo-code would need to be performed at least once and, at most, four times (once for each of the active grid points close to the object providing the location update.

Of course, the output and the use of a determination of whether there exists a crowd, as well as the determination of where within the grid this crowd is, can be used for a variety of different purposes depending on the application and the services envisioned by the location tracking system as discussed further below.

Figure 3:
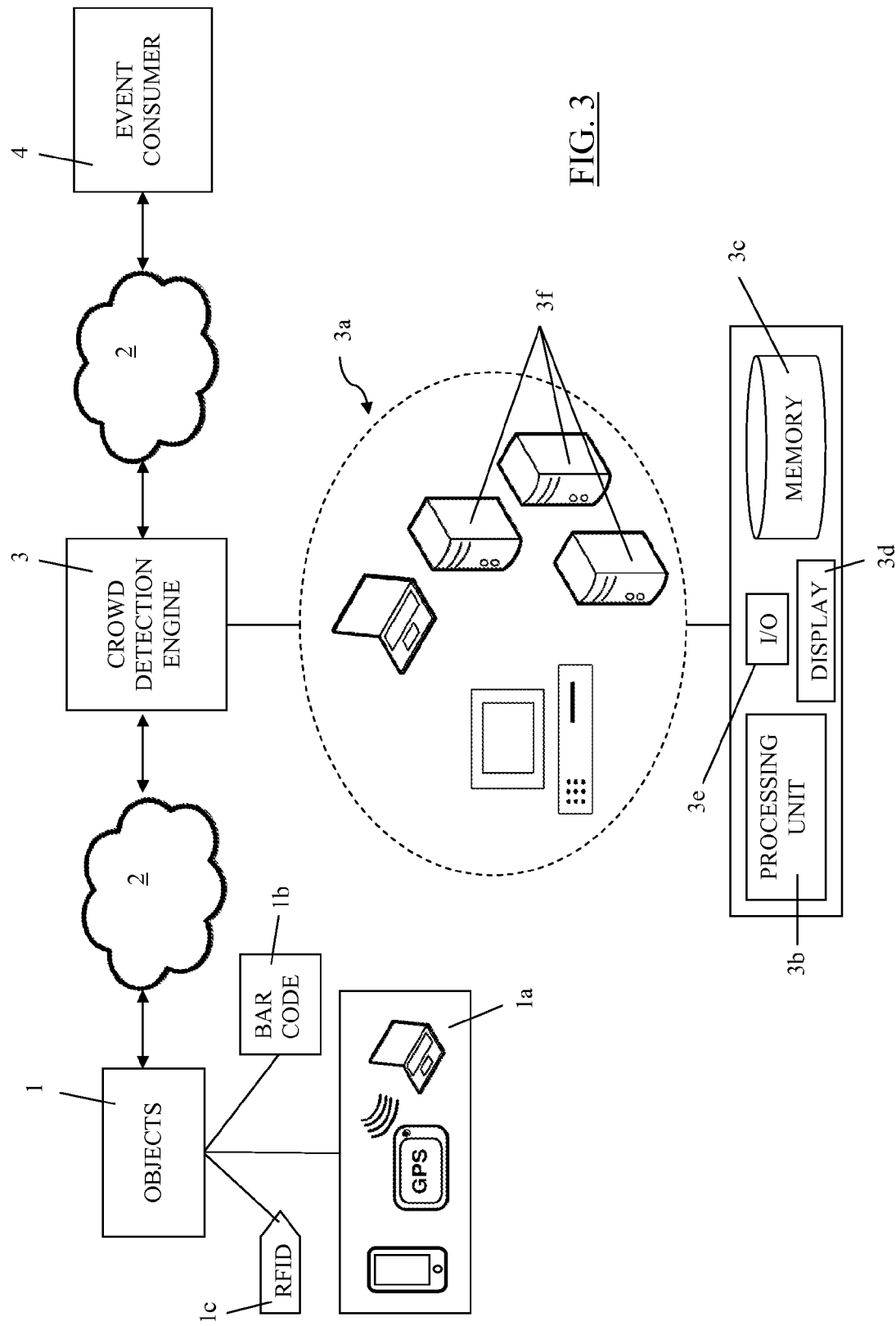
FIG. 3 schematically shows an exemplary computer system for receiving and processing the location updates.

Referring to FIG. 3, an exemplary system architecture for receiving and processing location updates and for providing crowd detection information for later use includes a plurality of objects 1 capable of communicating their location via a network 2 to a crowd detection engine 3. The objects can be GPS-enabled devices 1a (e.g., smartphones, tablets, navigation systems, cameras, etc.), bar code scanners 1b, RFID scanners 1c, or any other device or sensor capable of generating location information. The network 2 represents all means of providing data from the objects 1 to the remotely and preferably centrally-located crowd detection engine 3, such as via satellite communication, radio communication, a telecommunications network, a Local or Wide Area Network or the Internet, Bluetooth, infrared, serial bus, etc. and using any known transfer protocol such as http or TCP/IP. In at least one embodiment, however, the object 1 and the crowd detection engine 3 are combined, for example, where the crowd detection engine 3 is embodied as an application on a smartphone, such as an application for indoor or outdoor navigation. As also discussed below, the event consumer 4 could be the smartphone user in this embodiment.

Location updates are periodically provided by each of the objects 1. These updates are preferably sent automatically by the objects, but could also be sent in response to requests from the crowd detection engine 3. An updated location of one of the objects 1 preferably includes, in each case, an object identifier, such as a serial number or mobile device number or identifier, for identifying the object and possibly to whom the object belongs, as well as the two-dimensional updated location provided by the object 1, for example, using GPS.

The crowd detection engine 3 consists of at least one computer system 3a having at least one processing unit 3b specially programmed to determine whether a crowd has formed, for example, based on the pseudo-code set forth above. The at least one processing unit 3b could consist of dedicated or programmable (i.e., by software) circuitry or logic. Additionally, the crowd detection engine 3 consists of at least one memory device 3c (e.g., Erasable Programmable Read-Only Memory (EPROM), magnetic disk drives, flash memory devices, etc.). The computer system 3a can be a standard personal computer with the specially-adapted processing unit or can be integrated into one or more of objects 1, for example, a smartphone. The computer system 3a can include a display 3d which can be used, for example, to display the generated grid and the location of the objects 1 within the grid, and, as is typically the case, an input/output (I/O) device 3e. In an embodiment, the computer system 3a is at least one server device 3f or, in a preferred embodiment, a cluster of the server devices 3f. Additionally, the crowd detection 3 could be distributed among different computer devices or systems 3a performing certain ones of the individual functions and communicating with each other. Moreover, by making software available over a network, programmable circuitry or logic can be specially adapted, for example, based on the pseudo-code set forth above, to perform the method for detecting a crowd, thereby allowing the present invention to be utilized in a cloud computing environment or as a software as a service (SaaS).

In an embodiment, each of the grid points determined to be active is assigned to an available one of the server devices 3f using a hash function and then these server devices perform the check of whether a crowd has formed in an area surrounding the grid point, for example, using the pseudo-code set forth above or similar functions. Therefore, when a location update arrives, the particular ones of the server devices 3f responsible for determining whether a crowd has formed around their respective grid points that are close to the updated location (and also possibly the old location) can be notified using the hash function. In this way, the computation by the server devices 3f is always local to the respective assigned grid point and each location update requires activity from a constant number of the server devices 3f. The server devices 3f can be application servers whose components are accessible through an application programming interface (API) to implement the method of detecting crowds discussed herein, for example, using the pseudo-code set forth above. Data servers can also be provided for the storing the coordinates of the grid points, sets of active grid points and/or the locations of the objects.

The event consumer 4 can be any entity interested in the determination of whether a crowd exists, such as government authorities, event centers, individual users (i.e., in this case the event consumer 4 are users associated with respective ones of the objects 1), telecommunications companies, computer network service providers, navigation system users or providers thereof, mobile device application users or providers, etc. As discussed above, the crowd detection engine 3 is programmed to output a determination to the event consumer 4 indicating whether there exists a crowd, and, in some embodiments, where this crowd is (e.g., which quadrant of the grid) and/or which object caused the formation of the crowd. This output can therefore be used to enable a wide variety of services. For example, if the crowd detection is being used by a government authority to control riots or traffic congestion, the output can be used to dispatch resources such as police or traffic control, or to change routes or traffic light settings. The output could also be used, for example, to inform individual users of the objects 1 that they are in a crowd, or approaching a crowd, such as by text message (SMS) or multimedia message (MMS) or other alert and could even be used to enable further services such as directions away from the crowd. Moreover, the crowd detection information could be useful in geofencing or other projects which analytically utilize geographic location information.

Figure 4:
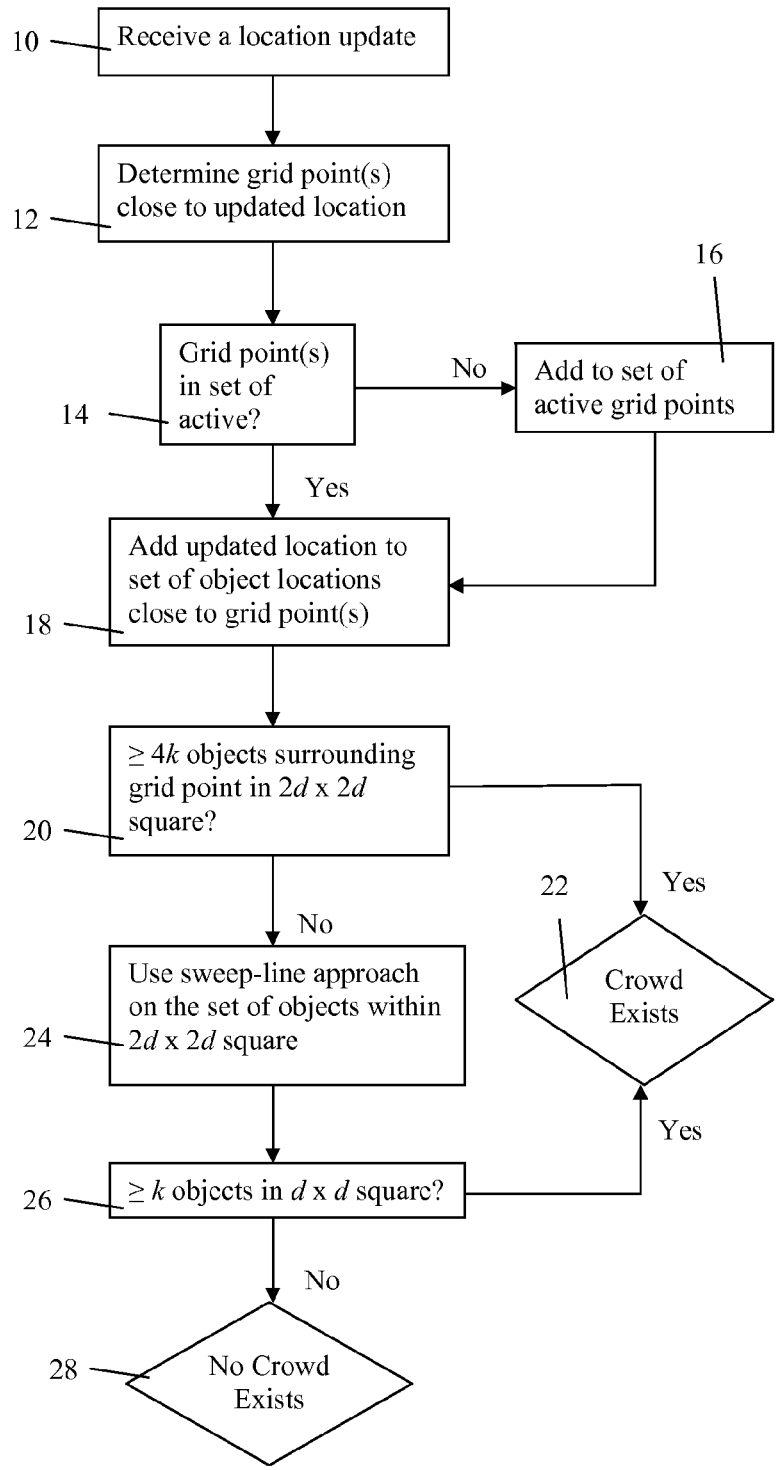
FIG. 4 schematically shows an exemplary flowchart to be performed by a processing unit of the crowd detection engine.

Referring now also to FIG. 4, an exemplary process flow to be performed by a processing unit 3a of the crowd detection engine 3 is shown. At step 10, an updated geographic location is received from one of the objects 1. It is then determined at step 12, which grid point(s) (at least one and at most four grid points in this embodiment) is/are close to the updated geographic location, for example, by determining a difference function on the coordinates of the updated geographic location and determining which grid points have coordinates that differ by less than the predetermined distance or spacing d in both dimensions. At step 14, a check is performed to determine if the grid point(s) is/are already stored as active grid points, and, if not, the grid point(s) is/are stored as active grid points at step 16. The updated location is also stored in step 18, preferably together in a set of all object locations previously or concurrently received and determined to be close to the same grid point. At step 20, it is determined whether there are 4 k or more objects surrounding each of the grid point(s) that is/are close (i.e., within the predetermined spacing d in both dimensions) to the updated geographic location. One example of performing step 20 is that one of the servers 3f assigned to a respective grid point checks its own or the respective memory device 3c containing the set of all objects near the respective grid point to determine if there are more than 4 k objects in this set. If this check returns the result that there are 4 k or more objects in the set, then an output can be made at step 22 indicating that a crowd exists. On the other hand, if the check returns the result that there are less than 4 k objects in the set, then the sweep-line approach is used at step 24 to determine if there is a d×d square within the 2d×2d square which contains k or more objects. As discussed above, the sweep-line approach is limited in this instance because there cannot be more than 4 k objects involved in obtaining a solution (calculation corresponds to 4 k log 4 k, as opposed to n log n). If the sweep-line approach returns the result from step 26 that there are k or more objects in some d×d square, then an indication can be output at step 22 that a crowd exists, and, if not, then an indication can be output at step 28 that no crowd exists.

As discussed already above, the invention is not limited, however, to outputs indicating whether a crowd exists. Rather, the output can also indicate, for example, where the crowd exists, such as which quadrant of the grid or where the d×d square is with respect to the grid (for example, what grid point is in the d×d square and what the coordinates are of the d×d square), which object(s) caused the crowd (for example, using an object identifier provided in the location update), etc. Such outputs enable a wide array of services, some examples of which have been discussed herein and others of which will be apparent to those skilled in the art after reading the present disclosure.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for detecting crowds in a location tracking system, the method comprising:
    defining, using at least one computer system, a grid in two dimensions in a geographic coordinate system, the grid having a predetermined spacing in each dimension between grid points of the grid;
    receiving a geographic location from each of a plurality of objects, the geographic location including coordinates in each of the two dimensions in the geographic coordinate system;
    comparing the geographic locations to the grid points and defining as an active grid point each of a plurality of the grid points that are positioned within the predetermined spacing to at least one of the objects in each of the two dimensions;
    storing each of the active grid points using at least one memory device of the at least one computer system;
    receiving an updated geographic location from a first one of the objects; and
    checking, by at least one processing unit of the at least one computer system and using the updated geographic location and the geographic locations of other ones of the objects, for an existence of a crowd by determining whether there are four or more times a predetermined threshold number of the objects that are located within the predetermined spacing in each of the two dimensions to a first one of the active grid points that is within the predetermined spacing in each of the two dimensions to the updated geographic location.

2. The method according to claim 1, further comprising:
    outputting a result indicating the existence of the crowd where the determining results in a determination that there are four or more times the predetermined threshold number of the objects that are located within the predetermined spacing in each of the two dimensions to the first one of the active grid points; or determining the existence of the crowd using a sweep-line approach where the determining results in a determination that there are not four or more times the predetermined threshold number of the objects that are located within the predetermined spacing, an amount of storage required by a segment tree of the sweep-line approach being independent from a total number of the objects.

3. The method according to claim 2, further comprising sending a notification to an event consumer indicating the existence of the crowd.

4. The method according to claim 3, wherein the notification includes a geographic location of the crowd.

5. The method according to claim 3, wherein the event consumer is a user of a mobile device and the notification is a text or multimedia message including directions out of or away from the crowd.

6. The method according to claim 1, further comprising storing, for each respective one of the active grid points, a set of all of the objects within the predetermined spacing in each of the two-dimensions to the respective active grid point using the at least one memory device.

7. The method according to claim 1, wherein the at least one computer system includes at least one of a smartphone, tablet, laptop, server device, navigation system and personal computer.

8. The method according to claim 1, wherein the at least one computer system includes a cluster of server devices, each of the server devices storing a respective one of the active grid points and being assigned to perform the processing with respect to the respective one of the active grid points using a hash function.

9. The method according to claim 8, further comprising notifying respective ones of the server devices responsible for the active grid points that are within the predetermined spacing in each of the two dimensions to the updated location.

10. The method according to claim 1, wherein the geographic coordinate system is the Global Positioning System (GPS) and the objects are GPS-enabled devices configured to send the geographic locations automatically or in response to a request from the at least one computer system.

11. A computer-readable, tangible, non-transitory medium having instructions therein which cause one or more processing units of at least one computer system to collectively perform the following steps:
comparing geographic locations received from each of a plurality of objects to grid points of a grid defined in two dimensions in a geographic coordinate system, the grid having a predetermined spacing in each dimension between the grid points and the geographic locations including coordinates in each of the two dimensions in the geographic coordinate system, each of a plurality of the grid points that are positioned within the predetermined spacing to at least one of the objects in each of the two dimensions being defined as active grid points; and
checking, using an updated geographic location received from a first one of the objects and the geographic locations of other ones of the objects, for an existence of a crowd by determining whether there are four or more times a predetermined threshold number of the objects that are located within the predetermined spacing in each of the two dimensions to a first one of the active grid points that is within the predetermined spacing in each of the two dimensions to the updated geographic location.

12. The medium according to claim 11, further comprising instructions which cause the one or more processing units of the at least one computer system to collectively perform the following additional steps:
outputting a result indicating the existence of the crowd where the determining results in a determination that there are four or more times the predetermined threshold number of the objects that are located within the predetermined spacing in each of the two dimensions to the first one of the active grid points; or
determining the existence of the crowd using a sweep-line approach where the determining results in a determination that there are not four or more times the predetermined threshold number of the objects that are located within the predetermined spacing, an amount of storage required by a segment tree of the sweep-line approach being independent from a total number of the objects.

13. The medium according to claim 12, further comprising instructions which cause the one or more processing units of the at least one computer system to collectively perform the farther step of sending a notification to an event consumer indicating the existence of the crowd.

14. The medium according to claim 11, wherein the medium is embodied in at least one of a smartphone, tablet, laptop, server device, navigation system and personal computer.

15. A computer system for detecting crowds in a location tracking system, the computer system comprising:
at least one memory device storing coordinates of geographic locations of a plurality of objects and grid points of a grid in two dimensions in a geographic coordinate system, the grid having a predetermined spacing in each dimension between the grid points; and
at least one processing unit configured to detect, based on an updated geographic location received from a first one of the plurality of objects, an existence of a crowd using an amount of storage of the at least one memory device that is independent from a total number of the objects;
wherein an amount of memory of the at least one memory device is linearly proportionate to the total number of objects being tracked in the location tracking system.

16. A computer system for detecting crowds in a location tracking system, the computer system comprising:
at least one memory device storing coordinates of geographic locations of a plurality of objects and grid points of a grid in two dimensions in a geographic coordinate system, the grid having a predetermined spacing in each dimension between the grid points; and
at least one processing unit configured to detect, based on an updated geographic location received from a first one of the plurality of objects, an existence of a crowd using an amount of storage of the at least one memory device that is independent from a total number of the objects;
wherein the at least one processing unit is configured to access the at least one memory device and compare the geographic locations with the grid points and define as an active grid point each of a plurality of the grid points that are positioned within the predetermined spacing to at least one of the objects in each of the two dimensions;
wherein the at least one processing unit is configured to determine whether there are four or more times a predetermined threshold number of the objects that are located within the predetermined spacing in each of the two dimensions to a first one of the active grid points that is within the predetermined spacing in each of the two dimensions to the updated geographic location.

17. The computer system according to claim 16, wherein the at least one processing unit is configured to:
- outputting a result indicating the existence of the crowd where the determining results in a determination that there are four or more times the predetermined threshold number of the objects that are located within the predetermined spacing in each of the two dimensions to the first one of the active grid points; or
- determine the existence of the crowd using a sweep-line approach where the determining results in a determination that there are not four or more times the predetermined threshold number of the objects that are located within the predetermined spacing.

18. The computer system according to claim 16, further comprising a plurality of server devices which collectively include the at least one processing unit and the at least one memory device, each of the server devices having an active one of the grid points assigned to it by a hash function and being configured to detect the existence of the crowd for the active one of the grid points.

\* \* \* \* \*